United States Patent
Grosskrueger et al.

(10) Patent No.: US 6,656,299 B1
(45) Date of Patent: Dec. 2, 2003

(54) METHOD AND APPARATUS FOR STRUCTURAL REPAIR

(75) Inventors: Duane D. Grosskrueger, Highlands Ranch, CO (US); Keith Y. Hora, Westminster, CO (US); Michael D. Krohn, Littleton, CO (US); Vittorio C. Orsini, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 75 days.

(21) Appl. No.: 10/024,917

(22) Filed: Dec. 19, 2001

(51) Int. Cl.[7] .................................................. B32B 35/00
(52) U.S. Cl. ............................ 156/98; 156/66; 156/92; 156/293
(58) Field of Search .............................. 156/91, 92, 94, 156/98, 66, 71, 293; 244/133; 264/36.22; 29/897.1, 402.01, 402.09, 402.11, 402.12, 402.13, 402.14, 402.15, 402.16, 402.17, 402.18

(56) References Cited

U.S. PATENT DOCUMENTS

| | | | |
|---|---|---|---|
| 4,517,038 A | 5/1985 | Miller | 156/98 |
| 4,588,626 A * | 5/1986 | Cologna et al. | 428/63 |
| 4,808,253 A | 2/1989 | Mimbs | 156/98 |
| 4,820,564 A * | 4/1989 | Cologna et al. | 428/63 |
| 4,824,500 A | 4/1989 | White et al. | 156/94 |
| 4,961,799 A | 10/1990 | Cologna et al. | 156/92 |
| 4,978,404 A | 12/1990 | Westerman | 156/98 |
| 5,023,987 A * | 6/1991 | Wuepper et al. | 29/402.11 |
| 5,034,254 A * | 7/1991 | Cologna et al. | 428/63 |
| 5,240,543 A * | 8/1993 | Fetterhoff et al. | 156/293 |
| 5,868,886 A | 2/1999 | Alston et al. | 156/98 |
| 5,882,756 A | 3/1999 | Alston et al. | 428/63 |
| 6,149,749 A | 11/2000 | McBroom | 156/94 |
| 6,206,067 B1 | 3/2001 | Kociemba et al. | 156/382 |
| 2001/0008161 A1 | 7/2001 | Kociemba et al. | 156/94 |

FOREIGN PATENT DOCUMENTS

EP    471923 A2 * 2/1992 ............ B29C/73/10

* cited by examiner

Primary Examiner—Michael W. Ball
Assistant Examiner—Gladys Corcoran
(74) Attorney, Agent, or Firm—Marsh Fischmann & Breyfogle LLP (57) ABSTRACT

A method for repairing a composite structure is herein disclosed, as well as a corresponding structure repaired using such methods. The structural repair method is a new fill-and-patch-type system that generally includes forming a recess in the structure and placing both a threaded insert and a potting material in the recess. Generally after the potting material has hardened, a patch is adhered to the potting material-filled recess, and a fixture is disposed over the recess. By directing a threaded fastener through the fixture and into the threaded insert, the fixture is drawn toward the structure and compresses the patch against the filled recess via the threaded fastener being tightened to supply sufficient compressional force to assist in bonding the patch to the repaired structure.

30 Claims, 4 Drawing Sheets

METHOD AND APPARATUS FOR STRUCTURAL REPAIR

FIELD OF THE INVENTION

The present invention generally relates to a method and apparatus for structural repair and, more particularly, to a method and apparatus for repairing a damaged or defective area of a structure.

BACKGROUND OF THE INVENTION

It is well known to implement patch repairs to damaged composite structures (such as aircrafts and/or spacecrafts) that are generally made up of sandwich reinforced materials having outer fiber-reinforced composite layers separated by a lightweight core made up of metallic or non-metallic honeycomb, structural foams, and/or wood fibers (e.g. balsa). Generally, damage areas (usually recesses) are formed in these composite structures as a result of fabrication defect(s) or impact(s) from an object. These recesses usually extend at least through an outer composite layer and into the central core of the composite structure.

Conventional repair of these composite structures generally involves drilling holes through the damaged outer composite layer and subsequently injecting adhesive and/or filler material into the core through these holes. This injection of adhesive is generally followed by bonding a pre-cured or co-cured patch to the repair area. While the adhesive which holds the patch to the repair area is drying, the patch is usually held in position using one or both a vacuum bag and tape. Use of the vacuum entails sealing the vacuum bag around the repair area and changing the pressure to approximately 1 atmosphere (up to 14.7 psi); while use of the tape to hold the patch in place should be obvious to those of ordinary skill in the art.

The use of tape and vacuums to provide compressional force on the patch has demonstrated ineffective results when these repair areas were tested for sheer and peel strength. Such ineffectiveness is due, at least in part, to conventional tape and vacuum methods only providing up to about 14.7 psi of force at sea level (and less at higher altitudes). Maximum bond strength cannot be attained at these conventional levels of compressional force. Further, it has been shown that the use of vacuum bags can reduce the bond strength of the adhesive between the patch and the repair area by up to 35%. Such a reduction in bond strength is due to incomplete chemical reactions undergone by the adhesives in a vacuum environment.

Other methods have attempted to increase compressional forces, but have sacrificed structural integrity of the original composite structure in the process. For example, one method consists of drilling a hole through the entirety of the composite structure and creating a vice-type apparatus to increase the compressional force on the patch. Such a method obviously results in an undesirable hole through the entirety of the composite structure. In practical terms, drilling a hole from the outside of an airplane into the fuselage would not promote the structural wellbeing of that aircraft. Yet another method of repair utilizes a plurality of pins which go through the entirety of the patch and into the composite structure. This pin method also has a drawback in that an increased number of holes are put into the outer composite layer of the structure, weakening the structure, with every attempt to strengthen the composite structure. Accordingly, the integrity of the composite structure is sacrificed every time another pin is driven into the structure.

It would therefore be desirable to have a method of repairing composite structures that provides greater compressional forces than conventional methods without sacrificing additional integrity of the composite structure.

SUMMARY OF THE INVENTION

The present invention is generally directed to a method and apparatus for structural repair. More specifically, the present invention is generally directed to a method and apparatus for repairing a damaged or defective area of a structure, such as any general composite structure. The repair method and structure of the present invention desirably addresses the lack of appropriate clamping force imposed on repaired areas of composite structures using conventional repair methods. Accordingly, any appropriate type/configuration of damaged or defective structure may benefit from performing repairs on such a structure utilizing the repair method and/or apparatus of the present invention. One particularly desirable application is the repair of the outer shell of a launch vehicle, an aircraft, a spacecraft, a rocket, or any other aerodynamic body that flies.

A first aspect of the present invention includes a method for repairing a structure having a damaged or defective area. The repair method generally includes forming a recess on an exterior surface of the structure. Once the recess exists, a threaded insert is placed in the recess and a first material is deposited in the recess. The particular order in which the threaded insert and the first material are placed in the recess is not critical. This first material is generally cured after it has been placed in the recess. After both the first material and threaded insert have been positioned in the recess, a patch is usually positioned over the recess. A compression fixture is then generally placed over the patch which covers the first material-filled recess. The compression fixture is then compressed against the exterior surface of one or both the structure and the first material by directing a threaded fastener through the compression fixture and into the threaded insert.

Various refinements exist of the features noted in relation to the subject first aspect of the present invention as well. Further features may also be incorporated in the subject first aspect of the present invention as well. These refinements and additional features may exist individually or in any combination. For instance, the recess can be formed by the outer surface of the structure obtaining a nick, notch, depression, dent, slit, cut, or the like. Some recesses can be intentionally formed and/or shaped to promote optimal repair of a damaged area of the structure. Generally, the size and shape of the original recess preferably encompasses the damaged area, but exceptions exist wherein the outer surface of the structure is augmented to change the size or shape of the original recess/damaged area. These recesses can be formed/shaped by machining, milling, hole-sawing, routing, and any other methods known in the art for forming and/or shaping a recess in a structure. Regardless of how the recess is formed, the depth of the recess is ideally limited to less than a wall thickness of the structure in which the recess is formed (i.e., the recess preferably does not extend through the wall thickness of the structure). In variations where the structure is a composite having first and second peripheral face sheets and an internal core, a residual thickness of the internal core material can be left in the recess to form a bottom surface of the recess.

Upon the threaded insert being placed in the recess in the first aspect, the threaded insert may be positioned in spaced relation to a bottom of the recess. In other words, the threaded insert may be positioned to avoid contact with the base/floor/bed of the recess. Additionally, the threaded insert may be positioned interiorly of a plane of the exterior surface of the structure. Put another way, the threaded insert may be positioned in the recess so that no portion of the threaded insert extends beyond the plane that contains the outer surface of the structure. In another embodiment, the threaded insert is positioned in the recess so that an end portion of the threaded insert and the outer surface of the structure are at least substantially coplanar. Other variations which reflect at least a portion of the threaded insert protruding from the recess and extending beyond the plane of the outer surface of the structure are contemplated.

The order in which the first material and the threaded insert are disposed in the recess in the case of the first aspect may be generally dependent upon, amongst other factors, the chemical and physical properties of the first material used. The method of the first aspect can include overfilling the recess with an amount of the first material. In other words, the amount of first material that is positioned in the recess can be greater than the volumetric space of the recess. The first material is preferably deposited around and in contact with the threaded insert. In other words, the first material touches and communicates with outer surfaces of the threaded insert to hold the insert in the recess. Preferably, the repairer tends to avoid depositing the first material in an aperture of the threaded insert during the placement of the first material and the threaded insert in the recess.

The first material used by the first aspect may be an adhesive material, and in any case is a material that is capable of holding the threaded insert in position within the recess. In one embodiment, the first material is a potting compound or any appropriate substitute which has adhesive properties as well as the ability to cure/harden. For example, the first material can include one or more epoxy adhesives. Preferably, the first material, in a cured condition, can withstand temperatures of at least about 200° F.; and more preferably at least about 300° F. In addition, the first material can include substantially the same or a different material than that which makes up the body of the structure. Some preferred variations of the first material are a mixture of at least one potting compound and a filler. In such preferred variations, the filler can be one or more of microballoons, microspheres, chopped fiber, other appropriate low-density material, and any combination thereof. The composition of the first material is only limited by the ability to harden/cure and the ability to hold and retain the position of the threaded insert in the recess at least during use of the compression fixture. Accordingly, the threaded insert is generally formed from a material which is receptive to adhesive properties of the first material.

After both the threaded insert and the first material are properly positioned in the recess, the first material is generally cured. "Curing" generally refers to one or more of a hardening, setting, and drying of the first material. The first material may be cured by exposing it to room temperature, by heating the first material, or by any other appropriate method. To promote maintaining the position of the first material in the recess, a caul sheet may be placed over the exterior surface of the first material. A caul sheet is generally defined as a rigid/semi-rigid implement which is placed over the recess (which is filled with the first material) to keep the first material in place (i.e. keep the first material from coming out of the recess). Use of a caul sheet in the repair process generally tends to provide a smooth surface to the cured first material. Generally, a vacuum bag, tape, or other appropriate temporary attaching means may then be utilized to maintain the position of the caul sheet on the first material that occupies the recess of the damaged area. Put another way, once the caul sheet is placed atop the first material-filled recess, the caul sheet may be either taped to the exterior surface of the structure, or a vacuum bag is secured to the exterior surface of the structure so that it at least encompasses the entirety of the caul sheet and the damaged area. Use of a vacuum bag to secure implements to a structure will be obvious to those of ordinary skill in the art.

After the curing process has been completed in the case of the first aspect, a peripheral surface of the cured first material which is preferably substantially aligned with the exterior surface of the structure, may contain some depressions and uneven areas. These depressions/uneven areas in the cured first material may be filled in with additional first material. Further, after the curing process, the peripheral surface of the cured first material may be smoothed (e.g., sanded down with sandpaper), for instance generally to a continuity of the exterior surface of the structure.

Once the first material in the recess is cured in the first aspect, the caul sheet and tape/vacuum bag may be removed from the repair area. The patch may be adhesively adhered to at least one of the exterior surface of the structure and the exposed peripheral surface of the cured first material so that the patch entirely encompasses at least the recess. This patch may generally be a composite material (preferably pre-cured) which is made up of one or both of carbon fiber reinforced plastic and glass fiber reinforced plastic. This patch can also be made up of a carbon/glass fiber reinforced plastic, an aromatic polyamide fiber (such as Kevlar® made by DuPont) reinforced plastic, aluminum alloy, titanium alloy, corrosion-resistant steel, or any appropriate patch material. Preferably, adhesive is spread over the substantial entirety of this patch and substantially all of the peripheral surface of the cured first material (as well as at least portions of the exterior surface of the structure which surrounds the recess), so that the adhesive-covered patch can be engaged to the adhesive-covered repair area. The side of the patch having adhesive applied to it is then at least generally positioned upon and pressed against the damaged area. However, other methods of affixing the patch at least to one or both of the peripheral surface of the cured first material and the exterior surface of the structure are contemplated, such as applying adhesive to only one of the components and/or applying adhesive to less than the entirety of the respective components, amongst others.

Generally, the patch used by the first aspect may contain a hole which is at least generally compatible in size and shape with the threaded fastener. This hole is generally lined up with the aperture of the threaded insert (which is embedded in the cured first material). The compression fixture may then be placed over the patched area. The compression fixture may be a rigid apparatus which also contains a hole compatible in size and shape with the threaded fastener. The hole of the compression fixture is aligned with the hole of the patch and the aperture of the threaded insert which is embedded in the cured first material. The threaded fastener is then directed through the hole in the compression fixture and the hole in the patch, and engaged into the aperture of the threaded insert. This threaded fastener, generally made from metal, nylon, or any other appropriate material, is then torqued/tightened into the threaded insert so that a head of the fastener draws the compression fixture toward the patched repair area. The threaded fastener is generally tightened until the compression fixture abuts and compresses the patch against at least the repair area. The amount of pressure desired from use of the compression fixture will dictate how far the threaded fastener is engaged into the threaded insert. The compression fixture is preferably compressed against one or both the patch and a portion of the structure disposed beyond a perimeter of the recess at a force of at least about 15 psi (pounds per square inch), and more preferably, at least about 30 psi. The threaded fastener is generally left securely engaged with the threaded insert until the adhesive has dried. Generally, the threaded fastener and the compression fixture are removed after the adhesive has set/dried.

The threaded fastener and compression fixture may be removed from the patched area in relation to the first aspect. A variety of steps can then be taken. For instance, a second material can be applied into the aperture in the threaded fastener (which is now fixed in the cured first material which is disposed in the recess covered by the patch) generally at most up to the point at which the aperture is filled with the second material. This second material can be the same or different than the first material. Alternatively, a low-profile filler bolt can be fitted into the aperture of the threaded insert. An end opposite a threaded end of the filler bolt can extend beyond the exterior surface of the structure, but preferably, the end opposite the threaded end of the filler bolt is substantially flush with or slightly recessed from the exterior surface of the structure. As another alternative, the aperture in the threaded insert can be left open and devoid of any filler. Additional functionality comes from repairing a structure using the method of the first aspect of the present invention in that the threaded insert in the recess can later be utilized as a point of reference for any repair of the structure. For instance, a device to assist in the subsequent repair of the structure can be attached to the structure via the threaded insert affixed in the recess of the structure.

In some variations of the first aspect, a plurality of fasteners may be installed through the patch and into one or both the cured first material within the recess and any portion of the structure disposed beyond a perimeter of the recess after the compression fixture and threaded fastener have been removed. The plurality of fasteners can include, but are not limited to, Huck-bolts, Jo-bolts, Composi-Loks, pins, and screws. In other words, the fasteners are generally "blind" mechanical fasteners that only need to be accessed from one end to be installed.

A second aspect of the present invention relates to a repaired structure. While the structure to be repaired is generally a launch vehicle, an aircraft, or a spacecraft, the invention can be applied to a variety of structures which preferably are fabricated at least in part from composite materials. In any event, the repaired structure includes a body having an exterior surface, a recess formed in the body, a first material disposed in the recess, and a threaded insert disposed within the first material. Those various features discussed above in relation to the above-described first aspect of the present invention may be incorporated in variations of the second aspect of the present invention as well, and in the manner noted above.

DETAILED DESCRIPTION

The present invention will now be described in relation to the accompanying drawings, which at least assist in illustrating the various pertinent features thereof. By way of initial overview, the present invention relates to a method for repairing a composite structure using a fill-and-patch-type system. One embodiment of such a method generally includes forming a recess in the composite structure and placing both a threaded insert and potting material into the recess. Generally, after the potting material has hardened (or cured), a patch is adhered to the potting material-filled recess, and a compression fixture is disposed over the recess. A threaded fastener is directed through the compression fixture and into the threaded insert. The fixture is then drawn toward the structure and compresses the patch against the filled recess via the threaded fastener being torqued into the threaded insert to supply sufficient compressional force between the compression fixture and the composite structure to assist in bonding the patch to the repaired structure.

Figure 1:
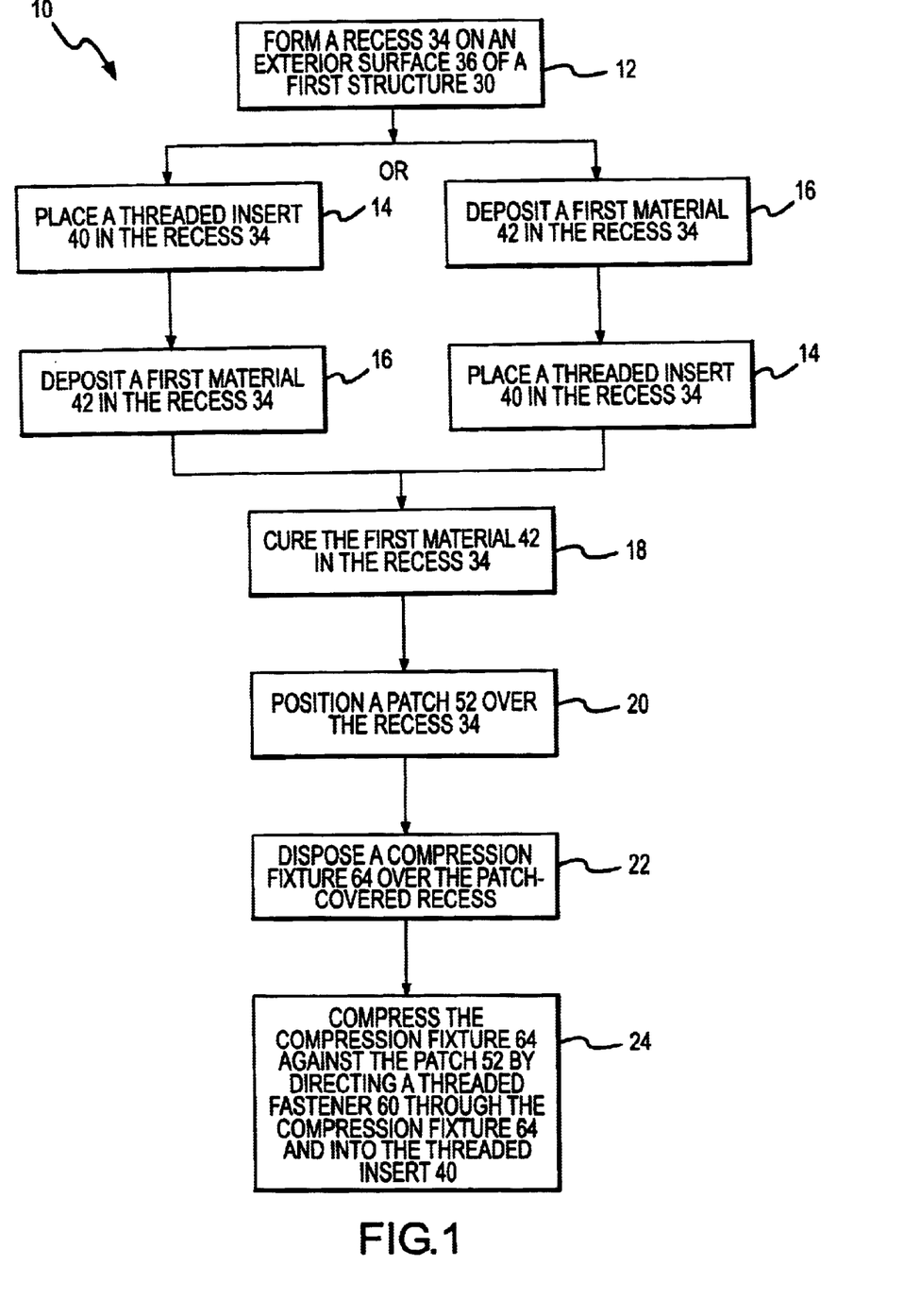
FIG. 1 is one embodiment of a repair protocol for a structure.
Figure 2:
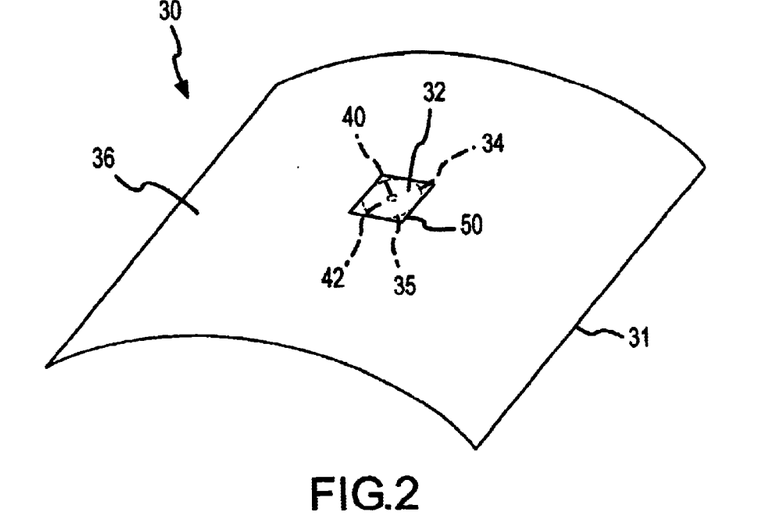
FIG. 2 is a schematic, perspective view of a portion of a repair protocol illustrating the use of a caul sheet during a curing step.
Figure 3:
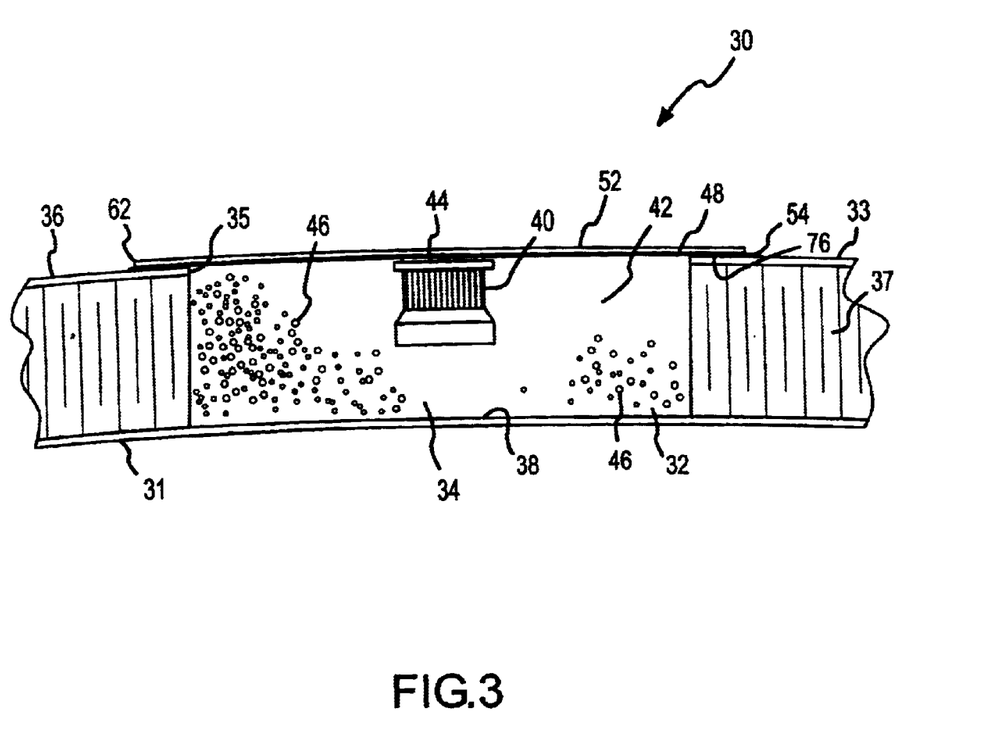
FIG. 3 is a cross-sectional view of a repaired structure.

FIG. 1 diagrammatically illustrates one embodiment of a protocol 10 for repair of a damaged or defective area 32 of a first structure 30 of FIGS. 2–5. This first structure 30 has a body 31 which includes a peripheral face sheet 33 and an internal core 37. The peripheral face sheet 33 of the first structure 30 is formed from carbon fiber reinforced plastic, glass fiber reinforced plastic, aromatic polyamide fiber (such as Kevlar® made by DuPont) reinforced plastic, or any other appropriate material. Additionally, the internal core 37 is a light-weight material such as metallic (e.g. aluminum) or non-metallic (e.g. Nomex manufactured by Créations Guillemot Inc. of Beauport, Québec, Canada) honeycomb, structural foam, balsa wood, a metal or metal alloy in an appropriate form, a metal matrix composite in an appropriate form (e.g., a hybrid of a metal/metal alloy and one or more non-metallic materials), or any other appropriate core material and in any appropriate form. Referring generally to FIGS. 1–3, the repair protocol 10 first includes a first step 12 of forming a recess 34 on an exterior surface 36 of the first structure 30. This recess 34 preferably encompasses an entirety of a damaged area on the body 31 (e.g., due to impact with some second structure). However, the recess 34 can be formed for any purpose. While a perimeter 35 of the recess 34 is shown in FIG. 2 as being substantially round, any appropriate shape that promotes repair of the damaged area 32 of the body 31 may be utilized. Further, any way of forming the recess 34 in the first structure 30 may be used, including, but not limited to, machining, milling, hole-sawing, and routing. Regardless of how the recess 34 is formed in the first structure 30, the recess 34 does not span through an entire wall thickness of the body 31 of the first structure 30 (e.g., FIG. 3). In other words, the recess 34 is not a "hole" which extends all the way through the first structure 30. Simply put another way, the recess 34 of the first structure 30 at least generally includes a bottom surface 38. This bottom surface 38 preferably is defined by a residual portion of the internal core 37.

After the recess 34 has been formed in the first structure 30, the repair protocol 10 of FIG. 1 provides for a second step 14 of placing a threaded insert 40 in the recess 34 and a third step 16 of depositing a first material 42 in the recess 34. As FIG. 1 illustrates, the order in which the threaded insert 40 and the first material 42 are placed in the recess 34 of the first structure 30 is not critical. What is important is that the first material 42 is positioned around and in contact with the threaded insert 40 so that the first material 42 touches and adhesively communicates with the threaded insert 40 to hold the threaded insert 40 in the recess 34. Put another way, the threaded insert 40 is at least generally designed to be one or both physically and chemically receptive to the adhesive binding properties of the first material 42. Additionally, the threaded insert 40 has an aperture 43 which is preferably devoid of the first material 42 after both the threaded insert 40 and the first material 42 have been placed in the recess 34. As shown in FIG. 3, the threaded insert 40 is positioned in spaced relation to the bottom surface 38 of the recess 34. In other words, the threaded insert 40 avoids direct physical contact with the bottom surface 38 of the recess 34. Embodiments are however contemplated which include a threaded insert 40 that is positioned against the bottom surface 38 of the recess 34. In addition, the threaded insert 40 has an upper portion 44 which is positioned interiorly of a plane of the exterior surface 36 of the first structure 30. In other words, the upper portion 44 of the threaded insert 40 is recessed with respect to the exterior surface 36 of the first structure 30 so that the upper portion 44 of the threaded insert is positioned between the plane of the exterior surface 36 of the first structure 30 arid the bottom surface 38 of the recess 34. Although this is preferred, the upper portion 44 could be disposed coplanar with the exterior surface 36 that is disposed about the recess 34 or could extend beyond this surface 36.

The first material 42 which is deposited in the recess 34 is generally a potting compound, such as an epoxy adhesive, core fill, other adhesives, or any other appropriate material that is able to maintain the position of the threaded insert 40 in the recess 34. The first material 42 can be made from the same or different material that is included in the composition of the first structure 30. The first material 42 is illustrated including a filler material 46 such as microballoons or microspheres/bond beads. This filler material 46 is generally used in combination with potting compound to make up the first material 42, and the filler material 46 generally has a density less than that of just the potting compound. Thus, the mixture of the potting compound and the filler material 46 preferably tends to enable a repair to be affected to the damaged area 32 of the first structure 30 while not substantially adding to the weight of the first structure 30.

In a fourth step 18 of the repair protocol 10 of FIG. 1, the first material 42 in the recess 34 is cured (i.e., hardened, set, and/or dried). The preferred curing process simply includes exposing the first material 42 to room temperature or heating the first material 42. An outer surface 48 of the cured first material 42 is preferably substantially aligned or coplanar with the exterior surface 36 of the first structure 30. After the curing step 18, depressions and/or uneven areas may be present on the outer surface 48 of the first material 42, but such depressions/uneven areas can be filled in with an appropriate material (e.g., additional "uncured" first material 42) and/or smoothed (e.g., sanded down) to a continuity of the exterior surface 36 of the first structure 30.

As shown in FIG. 2, a caul sheet 50 can be laid over the outer surface 48 of the first material 42 and utilized during the curing process at least generally to keep the first material 42 from coming out of the recess 34. Use of the caul sheet 50 in the repair process can provide an additional benefit of causing a smooth outer surface 48 to be formed on the cured first material 42. Generally, a vacuum bag or tape (not shown) is utilized to maintain the position of the caul sheet 50 on the first material 42 which occupies the recess 34 of the damaged area 32. Appropriate application and type of caul sheet 50 utilized to maintain the location of the first material 42 in the recess 34 will be obvious to those of ordinary skill in the art. Regardless if a caul sheet 50 is used or not, upon completion of the curing process, the first material 42 can generally withstand temperatures in excess of about 200° F.

A fifth step 20 in the repair protocol 10 of FIG. 1 includes positioning a patch 52 over the recess 34 (after the caul sheet 50 and tape/vacuum bag are removed from the damaged area 32 if such components are used). Between the patch 52 and the combination of the exterior surface 36 of the structure 30 and the outer surface 48 of the cured first material 42 is a layer of an appropriate adhesive 54. This patch 52 may be formed of any appropriate material. In one embodiment, the patch 52 is generally made up of carbon fiber reinforced plastic and/or glass fiber reinforced plastic and is generally a composite. In other words, the patch 52 in this case is made up of a plurality of layers of appropriate patch material. The thickness of the patch 52 is generally a function of, amongst other factors, desired load requirements, required strength of the resultant repair, adhesives properties, and structural environment of the first structure 30. The layer of adhesive 54 is generally uniformly distributed between the outer surface 48 of the cured first material 42 and the patch 52, so that the patch 52 can be adhesively affixed to the outer surface 48 of the cured first material 42 and an appropriate portion of the exterior surface 36 of the first structure 30 that is disposed about the recess 34. The layer of adhesive 54 can include epoxies, polycyanate pastes, thermoplastic or thermosetting resins, or any other appropriate adhesive. Glass bond beads or any other appropriate filler material 46 may be added to the adhesive 54, for example, to at least generally assist in controlling the bond thickness (i.e., the distance between the patch 52 and the outer surface 48 of the first material 42). The adhesive 54 may be applied in any appropriate manner such as to one or more of the aforementioned components (e.g. 52, 42, 30) and/or to up to the entirety of the respective surfaces (e.g. 48, 36) of the respective components.

This patch 52 has an appropriate perimeter configuration and preferably extends beyond the perimeter 35 of the recess 34 so as to have an annular outer portion that is affixed to the exterior surface 36 of the body 31. The patch 52 also has a preferably substantially round hole 56 in the approximate center of the patch 52. This hole 56 at least generally lines up with the aperture 43 of the threaded insert 40. As such, a shaft 58 of an appropriate threaded fastener 60 can pass through the hole 56 of the patch 52 and into the aperture 43 of the threaded insert 40. While other configurations/shapes of patches 52 can be used (e.g., triangular, quadrilateral, elliptical, etc.), a round patch 52 having a substantially round hole 56 in the approximate center of the patch 52 enables a repairer to simply line up the patch hole 56 with the aperture 43 of threaded insert 40 to appropriately apply the patch 52 to the damaged area 32. Stated another way, the edges 62 of round patch 52 do not need to be rotationally positioned to at least align if not cover the perimeter 35 of the recess 34 with at least the edges 62 of the patch 52, since the edges 62 are substantially equidistantly spaced from the center hole 56 of the patch 52. Accordingly, use of the round patch 52 generally requires simply selecting a dimension of the patch 52 sufficient in radial size to at least generally cover the entire perimeter 35 of the recess 34 when the hole 56 of the patch 52 is lined up with the aperture 43 of the threaded insert 40. In other words, use of the round patch 52 alleviates the burden of aligning corners and varying edges of a patch 52 having a non-circular configuration (e.g. a square configuration) with the perimeter 35 of the recess 34. However, once again, any appropriate perimeter configuration may be used for the patch 52, the hole 56 may be of any configuration, and the hole 56 may assume any position on the patch 52.

Figure 4:
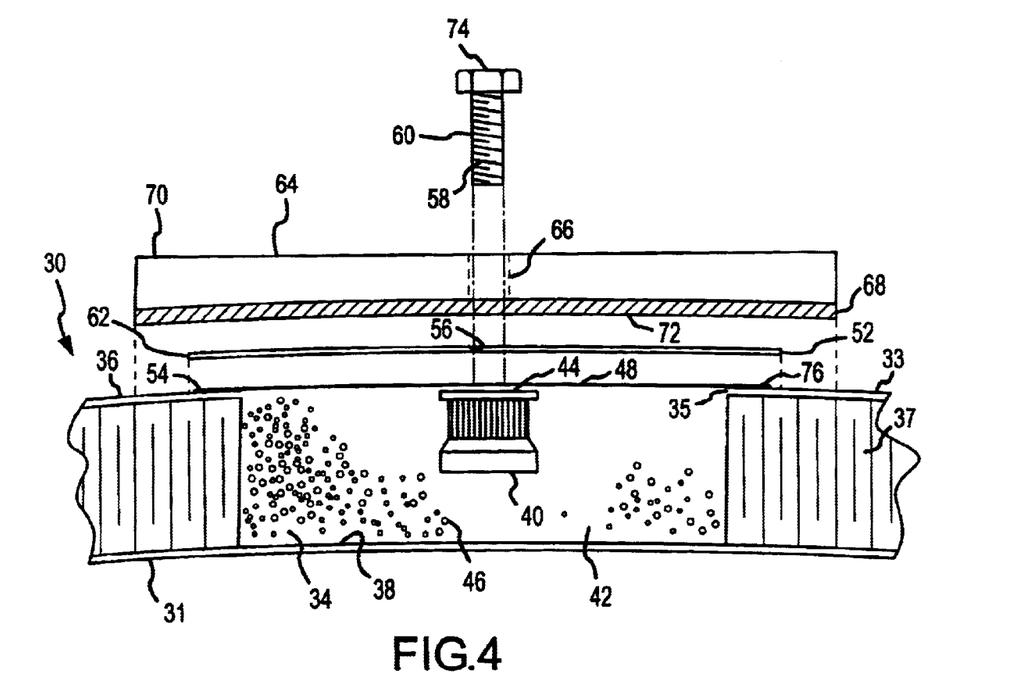
FIG. 4 is a partial exploded cross-sectional view of a structure during repair.

Once the patch 52 is appropriately positioned on the cured first material 42, a sixth step 22 of the protocol 10 of FIG. 1 is directed to disposing a compression fixture 64 over the patch-covered recess 34. As illustrated in FIG. 4, the compression fixture 64 is placed atop the patch 52 so that the patch 52 is positioned at least generally between the cured first material 42 and the compression fixture 64. Preferably the compression fixture 64 extends beyond the outer perimeter of the patch 52. The compression fixture 64 is generally made up of at least a rigid plate 66, and optionally, an at least partially resilient layer 68 which abuts the patch 52. This plate 66 is generally made up of aluminum alloy, steel, composite, or any appropriate rigid material for compressing the patch 52 against the first structure 30. Additionally, this optional resilient layer 68 can be made up of neoprene, a fluoroelastomer (such as Viton® made by DuPont), butyl rubber, foam rubber, or any other appropriate material. An opening 66, at least generally compatible in size and shape with a threaded fastener 60 of the compression fixture 64, spans the entire thickness of the compression fixture 64 from a top 70 to a bottom 72 of the compression fixture 64. The opening 66 in the compression fixture 64 is at least generally aligned with the hole 56 of the patch 52 and the aperture 43 of the threaded insert 40 that is disposed in the cured first material 42.

In a seventh step 24 of the repair protocol 10 of FIG. 1, the compression fixture 64 is compressed against the patch 52 by directing the threaded fastener 60 through the opening 66 in the compression fixture 64 and the hole 56 in the patch 52, and into the aperture 43 of the threaded insert 40. This threaded fastener 60, generally made from metal, nylon, or any other appropriate material, provides compressional force for appropriate repair by being torqued/tightened into the threaded insert 40 so that a head 74 of the threaded fastener 60 pushes the compression fixture 64 toward the threaded insert 40 that is disposed in the first material 42 of the recess 34 in the body 31 of the first structure 30. The threaded fastener 60 is generally tightened until the head 74 of the threaded fastener 60 causes the compression fixture 64 to abut and compress the patch 52 against at least the outer surface 48 of the first material 42, and as noted above also preferably engages an annular portion of the exterior surface 36 of the body 31 of the first structure 30. The amount of pressure desired from use of the compression fixture 64 will dictate how far the threaded fastener 60 is engaged into the threaded insert 40. In other words, the further the shaft 58 of the threaded fastener 60 is torqued into the aperture 43 of the threaded insert 40, the greater the compressional force of the compression fixture 64 against the patch 52. The compressional force generated by using compression fixture 64 in the manner described in the repair protocol 10 is at least about 15 psi (pounds per square inch) and can exceed 40–50 psi. As shown in FIGS. 3–4, the compression fixture 64 is compressed against the patch 52 and preferably the annular portion 76 of the first structure 30 that again is disposed beyond the perimeter 35 of the recess 34. Once the adhesive 54 has dried or cured, the threaded fastener 60 is withdrawn from the threaded insert 40 and the compression fixture 64 is removed/disassociated from the patch 52 and the annular portion 76 of the first structure 30.

Figure 5:
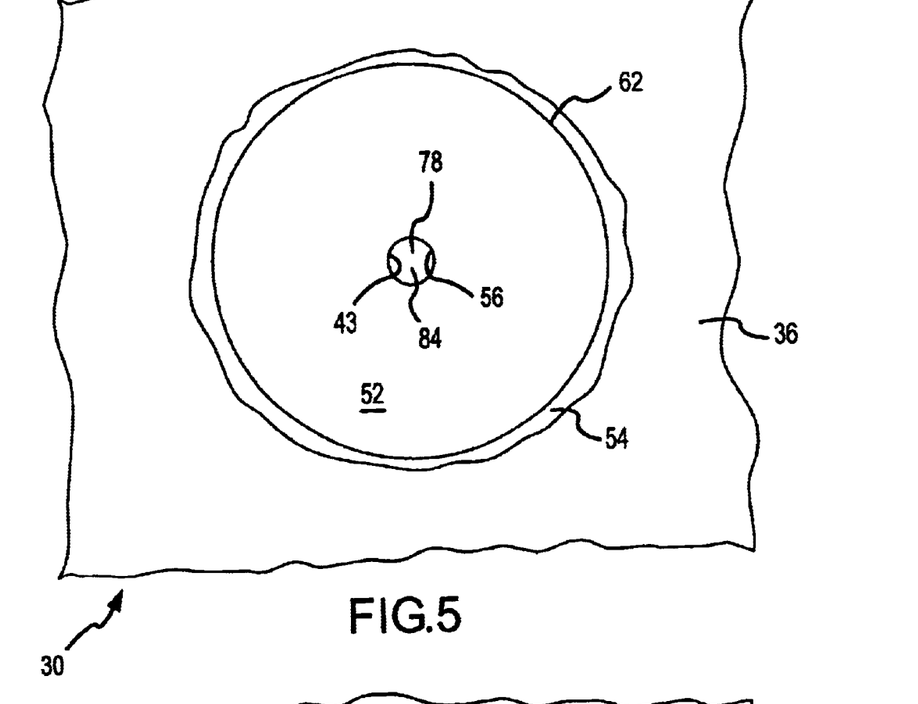
FIG. 5 is a top view of a repaired structure having a filler occupying the aperture of the threaded insert after the threaded fastener and compression plate have been removed from the damaged area.

FIG. 5 illustrates the first structure 30 after the compression fixture 64 and the threaded fastener 60 have been removed. As a result of the compressional force exerted on the patch 52, excess adhesive 54 was squeezed out from between the patch 52 and the outer surface 48 of the cured first material 42. Excess adhesive 54 can be prevented from spanning out beyond the edges 62 of the patch 52 by controlling one or both the amount and the position of application of adhesive 54 on one or more of the patch 52, the outer surface 48 of the first material 42, and the exterior surface 36 of the first structure 30. Conventional methods of controlling flow of a material, such as using Teflon® tape, to protect areas which are desired to be free of adhesive can also be used.

Still referring to FIG. 5, a low-profile filler bolt 78 has been fitted into the aperture 43 of the threaded insert 40 to fill the open aperture 43 of the threaded insert 40. An end 84 of the filler bolt 78 opposite a threaded end (not shown) of the filler bolt 78 is preferably substantially flush with the exterior surface 36 of the first structure 30. The end 84 of the filler bolt 78 is designed and configured to be removed and replaced at will so that the aperture 43 of the threaded insert 40 can be utilized as a point of reference or point of attachment for tools to assist in subsequent repair of the first structure 30.

Figure 6:
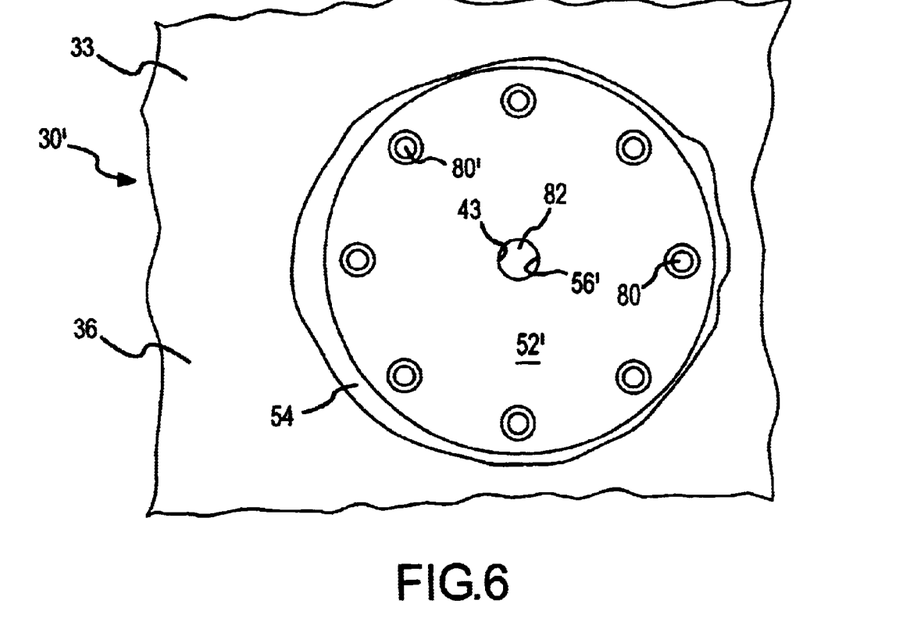
FIG. 6 is a top view of a repaired structure having a plurality of supplemental mechanical fasteners about the periphery of the patch.

A variation of the repaired first structure 30 is illustrated in FIG. 6. Corresponding components are identified by the same reference numerals, although a "single prime" designation is used in FIG. 6 to designate the existence of at least one structural difference from the above-discussed embodiment. The repaired first structure 30' of FIG. 6 principally differs from the FIG. 5 embodiment by including a plurality of supplemental fasteners 80 which are installed through the patch 52' and into one or more of the cured first material 42 within the recess 34, the portion 76 of the face sheet 33 covered by the patch 52', and the internal core 37 of the first structure 30'. These supplemental fasteners 80 can include, but are not limited to, Composi-Lok and Radial-Lok fasteners (manufactured by Monogram Aerospace Fasteners of Los Angeles, Calif.), Huck bolts (manufactured by Huck International, Inc. of Tucson, Ariz.), Jo-bolts, pins, and screws. In other words, the supplemental fasteners 80 are generally "blind" mechanical fasteners that only need to be accessed from one end to be installed. In addition, instead of a low-profile filler bolt, 78 being used to "fill" or occupy the aperture 43 of the threaded insert 40, a second material 82 is applied through the hole 56 of the patch 52' and into the aperture 43 of the threaded fastener 40 up to about level with the exterior surface 36 of the first structure 30'. This second material 82 can have the same composition as the first material 42, or can be epoxy, silicone, paste adhesive, or any other appropriate caulk and/or filler material.

In summary, the repair protocol 10 described herein enables a repairer to provide greater compressional force on a fill-and-patch-type repair area than conventional methods. This increased compressional force is provided by utilizing the first structure 30 as a first end of a vice-type mechanism, wherein the compression fixture 64 is used as a second end of the vice-type mechanism. The first and second ends of this vice-type mechanism are drawn toward one another by passing the threaded fastener 60 through the opening 66 in the compression fixture and engaging and tightening the threaded fastener 60 into the aperture 43 of the threaded insert 40. As a result, compressive force levels previously unattained using conventional fill-and-patch-type methods of repair are now attainable through use of the disclosed repair protocol 10.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed:

1. A method for repairing a first structure having a first damaged area, the method comprising the steps of:
    forming a recess on an exterior surface of said first structure;
    placing a threaded insert in said recess;
    depositing a first material in said recess;
    curing said first material in said recess after said placing step and said depositing step;
    positioning a patch over said recess after said placing step and said depositing step;
    disposing a fixture over said recess subsequent to said positioning step; and
    compressing said fixture against said patch after said curing step and said positioning step, said compressing step comprising directing a threaded fastener through said fixture and said patch and into said threaded insert after said disposing step.

2. A method, as claimed in claim 1, wherein said forming step comprises encompassing said first damaged area.

3. A method, as claimed in claim 1, wherein said forming step is selected from the group consisting of machining, milling, hole-sawing, and routing.

4. A method, as claimed in claim 1, wherein said forming step comprises limiting a depth of said recess to less than a wall thickness of said first structure.

5. A method, as claimed in claim 4, wherein said first structure is a composite comprising first and second peripheral face sheets and an internal core between said first and second peripheral face sheets, and wherein said limiting step of said forming step comprises precluding removal of a substantial amount of internal core material such that some residual thickness of said internal core comprises a bottom surface of said recess.

6. A method, as claimed in claim 1, wherein said placing step is executed after said depositing step.

7. A method, as claimed in claim 1, wherein said placing step comprises positioning said threaded insert in spaced relation to a bottom of said recess.

8. A method, as claimed in claim 1, wherein said placing step comprises disposing said threaded insert interiorly of a plane of said exterior surface of said first structure.

9. A method, as claimed in claim 1, wherein said depositing step comprises overfilling said recess with an amount of said first material.

10. A method, as claimed in claim 1, wherein said depositing step comprises depositing said first material around and in contact with said threaded insert, and wherein said depositing step comprises attempting to avoid depositing said first material in an aperture of said threaded insert.

11. A method, as claimed in claim 1, wherein said curing step is selected from the group consisting of allowing said first material to set at room temperature and heating said first material.

12. A method, as claimed in claim 1, further comprising filling in any depressions in said first material with additional said first material after said curing step.

13. A method, as claimed in claim 1, further comprising smoothing a peripheral surface of said first material to a continuity with said exterior surface of said first structure after said curing step.

14. A method, as claimed in claim 1, wherein said curing step comprises situating a caul sheet on said first material after said depositing step and said placing step.

15. A method, as claimed in claim 14, wherein said situating step comprises temporarily maintaining a position of said caul sheet on said first material.

16. A method, as claimed in claim 1, wherein said positioning step comprises adhering said patch to at least one of said first structure and said first material utilizing an adhesive.

17. A method, as claimed in claim 1, wherein said first structure is selected from the group consisting of a launch vehicle, an aircraft, a spacecraft, a rocket, or an aerodynamic body that flies.

18. A method, as claimed in claim 1, further comprising installing a plurality of fasteners through said patch and into at least one of said first material within said recess and any portion of said first structure disposed beyond a perimeter of said recess.

19. A method, as claimed in claim 18, wherein said plurality of fasteners comprises blind mechanical fasteners that only need to be accessed from one end to be installed.

20. A method, as claimed in claim 1, wherein said compressing step comprises urging said fixture against a portion of said first structure disposed beyond a perimeter of said recess at a force of at least 15 psi.

21. A method, as claimed in claim 1, wherein said compressing step comprises urging said fixture against a portion of said first structure disposed beyond a perimeter of said recess at a force of at least 30 psi.

22. A method, as claimed in claim 1, further comprising removing said threaded fastener and said fixture after said compressing step.

23. A method, as claimed in claim 22, further comprising applying a second material inside an aperture of said threaded insert subsequent to said removing step.

24. A method, as claimed in claim 23, wherein said second material substantially fills said aperture of said threaded insert.

25. A method, as claimed in claim 22, further comprising fitting a low-profile filler bolt into an aperture of said threaded insert subsequent to said removing step.

26. A method, as claimed in claim 25, wherein an end opposite a threaded end of said filler bolt extends beyond said exterior surface of said first structure.

27. A method, as claimed in claim 25, wherein an end opposite a threaded end of said filler bolt is substantially flush with said exterior surface of said first structure.

28. A method, as claimed in claim 25, wherein an end opposite a threaded end of said filler bolt is recessed with respect to said exterior surface of said first structure.

29. A method, as claimed in claim 1, further comprising utilizing said threaded insert in said recess as a point of reference for any subsequent repair of said first structure.

30. A method, as claimed in claim 1, further comprising utilizing said threaded insert in said recess for subsequently attaching a device to said first structure for assisting in any subsequent repair of said first structure.

* * * * *